(12) United States Patent
Frutschi et al.

(10) Patent No.: US 6,269,624 B1
(45) Date of Patent: Aug. 7, 2001

(54) METHOD OF OPERATING A POWER PLANT WITH RECYCLED $CO_2$

(75) Inventors: Hans Ulrich Frutschi, Rinikon; Hans Wettstein, Fislisbach, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/300,276

(22) Filed: Apr. 27, 1999

(30) Foreign Application Priority Data

Apr. 28, 1998 (EP) .................................................. 98810378

(51) Int. Cl.⁷ ......................................................... F02C 7/10
(52) U.S. Cl. ........................................... 60/39.02; 60/39.52
(58) Field of Search ................................. 60/39.02, 39.07, 60/39.31, 39.52

(56) References Cited

U.S. PATENT DOCUMENTS

| | | | |
|---|---|---|---|
| 4,434,613 | * 3/1984 | Stahl | 60/39.52 |
| 4,498,289 | 2/1985 | Osgerby . | |
| 4,528,811 | * 7/1985 | Stahl | 60/39.52 |
| 5,175,995 | 1/1993 | Pak et al. . | |
| 5,724,805 | * 3/1998 | Golomb et al. | 60/39.52 |

FOREIGN PATENT DOCUMENTS

| | | |
|---|---|---|
| 3643401A1 | 6/1988 | (DE) . |
| 4303174A1 | 8/1994 | (DE) . |
| 2202231 | 5/1974 | (FR) . |
| 04279729 | 10/1992 | (JP) . |
| WO95/02115 | 1/1995 | (WO) . |
| WO97/44574 | 11/1997 | (WO) . |

OTHER PUBLICATIONS

"Natural Gas Fired Combined Cycle Power Plant with $CO_2$ Capture", Shao, et al., Energy Conversion and Management, Dec. 1995, pp. 1115–1128.

* cited by examiner

*Primary Examiner*—Louis J. Casaregola
(74) *Attorney, Agent, or Firm*—Burns, Doane, Swecker & Mathis, L.L.P.

(57) ABSTRACT

In a method of operating a power station plant with a closed or virtually closed $CO_2$ process, a fuel quantity (21) and oxygen (18) required in this regard for the oxidation are introduced into the cycle for the internal combustion. A recuperator (8) acts on the downstream side of a turbine (2) belonging to the power station plant, at least one heat sink (24) operating downstream of this recuperator before the cycle medium (6) flows back into a compressor (1) which likewise belongs to the power station plant. A partial quantity of the compressed cycle medium (10) is directed into a condensing plant, the liquid $CO_2$ formed here being disposed of in the best possible way.

6 Claims, 5 Drawing Sheets

METHOD OF OPERATING A POWER PLANT WITH RECYCLED $CO_2$

FIELD OF THE INVENTION

The present invention relates to methods of operating power station plants, and more particularly, to methods and apparatus for reducing the discharge of $CO_2$ and other harmful gases.

BACKGROUND OF THE INVENTION

Machines with internal combustion burn their fuel in compressed atmospheric air and mix their combustion gases inherently with this air and the residual oxygen which is not utilized. In this process, the fuels, which are almost always carboniferous, produce, inter alia, $CO_2$, which is considered to be a greenhouse gas. The common utilization of fossil fuels nowadays releases $CO_2$ quantities which constitute a risk, discussed worldwide, to the global climate. An intensive search for $CO_2$-free technologies is therefore already under way.

Energy supply is nowadays determined by the utilization of fossil fuel energy in machines with internal combustion, the disposal of the highly diluted $CO_2$ taking place into the atmosphere.

The $CO_2$ separation from the exhaust gases with disposal by liquefaction, separation and sealing off from the atmosphere would be obvious. However, due to the large volumetric flows, such a plan cannot be put into practice.

A further known possibility is the recirculation of cooled-down exhaust gases into the intake of machines with internal combustion. This may take place to the extent that the oxygen of the air is just used up. In this case, however, the exhaust gas still remains mixed with the atmospheric nitrogen, and the $CO_2$ separation problem is thus only marginally reduced.

Furthermore, all air-operated internal combustion engines also produce nitrogen oxides, which act as air pollutants and the generation of which is controlled by costly measures.

SUMMARY OF THE INVENTION

Accordingly, one object of the invention, is to provide a novel method of operating a power station plant of the type mentioned above to dispose of the accumulating $CO_2$ and to do so in an environmentally compatible manner, and at the same time another object of the invention is to eliminate the atmospheric nitrogen oxides which likewise accumulate and to maximize the efficiency gain of the power station plant.

The essential advantages of the invention may be seen in the fact that, here, a method is proposed in which the $CO_2$ is delivered in a pure form and under pressure for the purpose of subsequent liquefaction. In this case, the method is based on a $CO_2$ process with internal combustion, in which process, in order to heat the $CO_2$ mass located in the cycle, which is preferably effected with the aid of a gaseous fuel, only that oxygen quantity which is required for the oxidation of this very same fuel is supplied.

By appropriate tapping of $CO_2$ from the cycle at a suit-able point, the degree of charging and thus the output of the process may be controlled continuously. Subsequently, by condensing the $CO_2$ separated from the process, that physical condition of this gas is then achieved at which the accumulating $CO_2$ can easily be disposed of from an environmentally compatible point of view, in particular as far as the greenhouse problem is concerned.

A further essential advantage of the invention may be seen in the fact that action is hereby taken to counteract the fact that all air-breathing internal combustion engines also produce nitrogen oxides, which act as air pollutants and the generation of which has to be controlled by costly measures, this not least in the light of the restrictive laws worldwide concerning the admissible pollutant emissions. By virtue of the fact that no atmospheric nitrogen gets into the flame during recirculation operation with pure oxygen, no $NO_x$ is produced either. If the fuel should carry bound nitrogen along with it, slight $NO_x$ formation is certainly to be expected. However, since the excess gas constitutes a much smaller quantity than the exhaust gas during air operation, its aftertreatment is simpler and cheaper.

Furthermore, an essential advantage of the invention may be seen in the fact that the method can be realized with the aid of several types of gas-turbine circuits, the circuits according to the invention constituting a specific optimum solution in relation to the preset parameters, and the efficiency gain being maximized by the recuperative waste-heat utilization (given priority here) according to the invention in connection with at least one heat sink arranged downstream.

Furthermore, the circuit according to the invention is especially suitable for transforming its inherent potential with regard to the cooled cycle medium by virtue of the fact that the most important units of this power station plant, with the cycle taken as a basis here according to the invention, are accommodated in a common pressure vessel. All the cooling problems can thus be solved in the simplest manner while maximizing the efficiency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
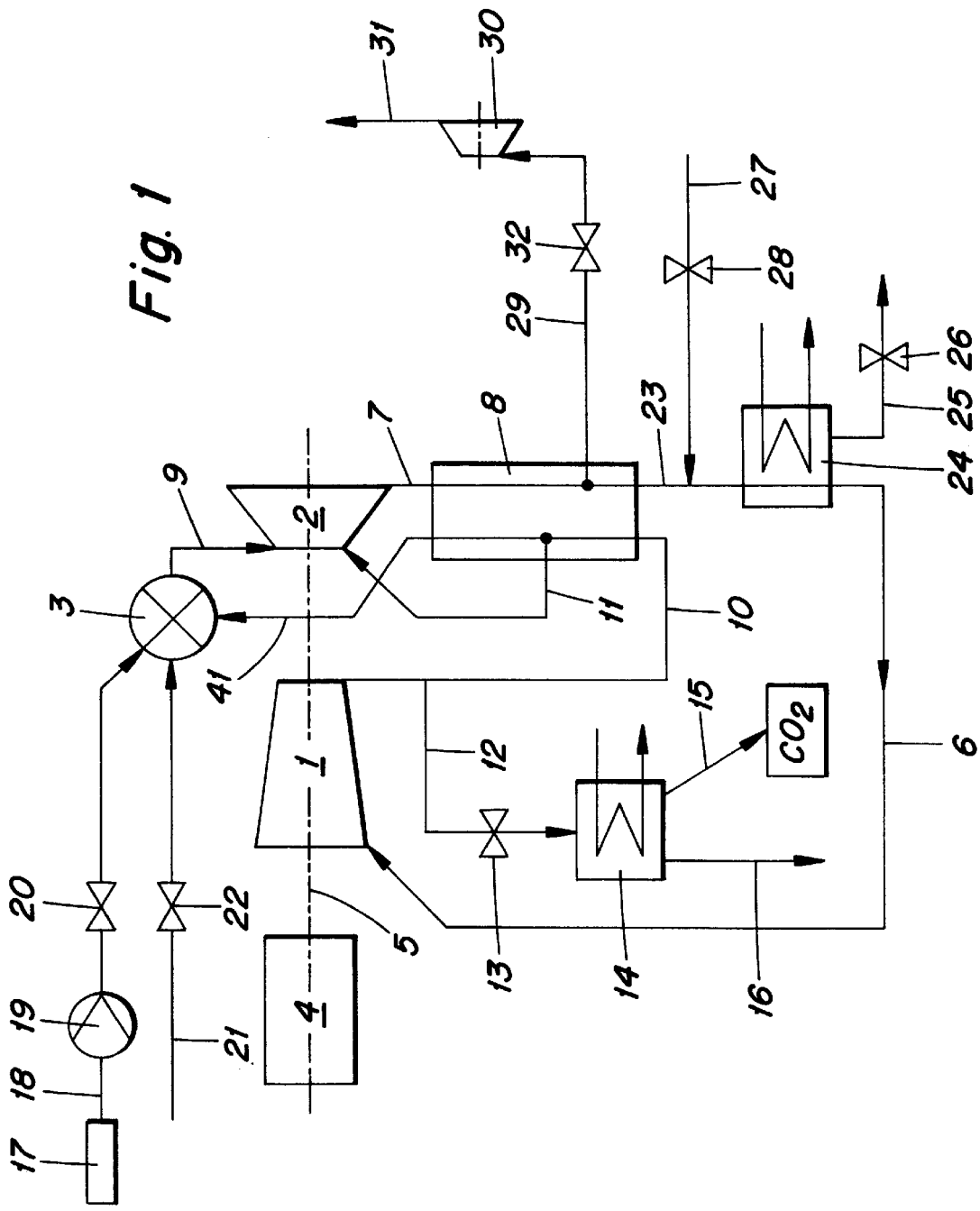
FIG. 1 shows a circuit of a gas-turbine process with recuperative waste-heat utilization and a turbo-compressor.

Referring now to the drawings, like reference numerals designate identical or corresponding parts throughout the several views, all the features which are not essential for the direct understanding of the invention have been omitted, and the direction of flow of the media is indicated by arrows, FIG. 1 shows a gas turbine having a closed cycle. In terms of machine units, the gas turbine or gas-turbine group comprises a compressor unit 1, a generator 4 coupled to this compressor unit, a turbine 2 coupled to the compressor unit, and a combustion chamber 3 acting between compressor unit 1 and turbine 2. The fluid-flow machines 1 and 2 may be coupled with the aid of a common shaft 5. As far as the compressor unit 1 is concerned, this compressor unit 1 may be equipped with at least one intercooler (not shown in any more detail) or with means for isothermal cooling. The advantages which are obtained from such a circuit having intercooling relate to the efficiency and the specific output. The cycle medium 6 drawn in by the compressor unit 1, which on the inlet side of the compressor unit 1 has a pressure of about 10 bar at a temperature of about 15° C. The medium 6 flows in counterflow direction, after compression 10 has taken place, through a recuperator 8, to which said exhaust gases 7, at a temperature of 780–800° C., are admitted, and then into the combustion chamber 3, in which the thermal processing of this medium to form hot gases 9 takes place, the hot gases 9 then being admitted to the turbine 2.

To cool the units of the gasturbine group which are subjected to high thermal loading, in particular the turbine 2, a partial quantity 11 of the compressed medium 10, namely $CO_2$, is branched off at a suitable point in the recuperator 8 and used for cooling said units, whether in closed and/or open flow paths. In this case, only the cooling of the turbine 2 is indicated here. This secondary flow 11 is in the order of magnitude of 4–8% of all the compressed circulated gas. As already indicated, this circulated gas mainly consists Of $CO_2$ but possibly also contains parasitic gases, which have been introduced with the oxygen and fuel and during the start-up with air, as well as conversion products thereof, for example $NO_X$. The degree of charging of the closed cycle is kept at the desired level by virtue of the fact that, in an intermittent or continuous manner, a certain quantity of this mass flow is branched off at a suitable point and condensed. In this case, this transformation takes place owing to the fact that a certain quantity 12 of the compressed cycle medium 10 is branched off downstream of the compressor 1 and directed through a cooler 14, in which this liquefaction takes place. After condensation has taken place, this liquefied $CO_2$ mass flow 15 is drawn off for disposal, for example and/or preferably on the sea bed or into a depleted natural-gas deposit.

This disposal at a suitable point with suitable means provides an instantaneous and lasting solution to the problem of the greenhouse effect due to the constant emission of gaseous $CO_2$ into the atmosphere. In addition, the parasitic gases are likewise separated in interaction with said cooler 14, in which case this very small mass flow 16 may be subjected to further separation or be delivered to the atmosphere. In connection with the operation of the combustion chamber 3, the oxygen quantity 18 produced in an airseparation plant 17 is subsequently compressed in a compressor 19 and fed into the combustion chamber 3 via a control member 20. A fuel 21, which is appropriately adjusted via a control member 22 and is preferably natural gas, or other hydrocarbons or CO or mixtures of the same, also flows parallel to the oxygen quantity 18 into the combustion chamber 3, the thermal processing of the compressed circulated gas 41 thermally treated by the flow in the recuperator being effected by the added oxygen quantity 18. The hot gas 9 coming from the combustion chamber is then expanded into the downstream turbine 2. For the purposes of the closed cycle shown here, the exhaust gases 7 flowing off from the turbine 2, as already mentioned briefly above, are directed through a recuperator 8 before they are again fed to the compressor already described. Downstream of said recuperator 8, the precooled circulated gas 23 is directed at a temperature of 195–245 C. through a heat sink 24, in which a water quantity is separated, the water 25 which accumulates here being drained via a control member 26. During this process, this heat sink is operated at least at ambient temperature.

Furthermore, the present circuit according to FIG. 1 has a means of starting the cycle, which consists in first of all filling the cycle with $CO_2$ 27 via a control system 28 and then starting it up. This feed line is established here downstream of the recuperator 8 and upstream of the heat sink 24. Furthermore, the circuit shown here has an additional extraction of a further quantity 29 of the cycle medium 10 from the recuperator 8 on the low-pressure side at a suitable point in order to load 32 an expander 30 in a controlled manner. The expanded cycle medium 31 drawn off, for example, can be fed back into the cycle again; condensation of the same is also possible here. For example, an optimum pressure for the charging of the cycle can be achieved via this expander 30, in which case a volume control is to be provided.

The circuit shown in FIG. 1 involves, strictly speaking, a virtually closed cycle system, which is of pressure-tight design. Vacuum-tight running of the cycle is also possible during various types of operation. The cycle charges or discharges itself by choking or opening an excess-gas valve 13 placed in the line 12, in the course of which the circulating mass flow and the output increase or decrease accordingly. When this valve 13 is opened, the pressure in the cycle drops, in which case vacuum can be produced in the feedback. During the entire pressure operation, the plant has an approximately constant efficiency, that is, within a design pressure range relative to the feedback of 0.5 to 5 bar within the output range of 10–100%. Within the lower pressure range, the condensation temperature in the heat sink 24 drops, a factor which allows the efficiency to even increase slightly. The undesirable loss of output known from stationary gas turbines with increasing site altitude and increasing intake temperature is thus avoided. If the plant is possibly operated with excess delivery to the atmosphere, the overall efficiency is further improved by its excess pressure being utilized in a turbine with additional power output. To this end, reference is made to the description of the following figures. It should not be left unmentioned that this process is distinguished by particular simplicity, i.e. a very cost-effective realizability, and has a high efficiency potential. It is also even better suited to the charging than a process with waste-heat utilization by a water/steam cycle, since the ratio of the heat capacities in the recuperator does not depend on the charging ratio. Furthermore, a great advantage of this process may be seen in the fact that it already has its efficiency optimum at small pressure ratios, within the range of 4–10 bar. Small pressure ratios promote high component efficiencies and low internal leakages.

Figure 2:
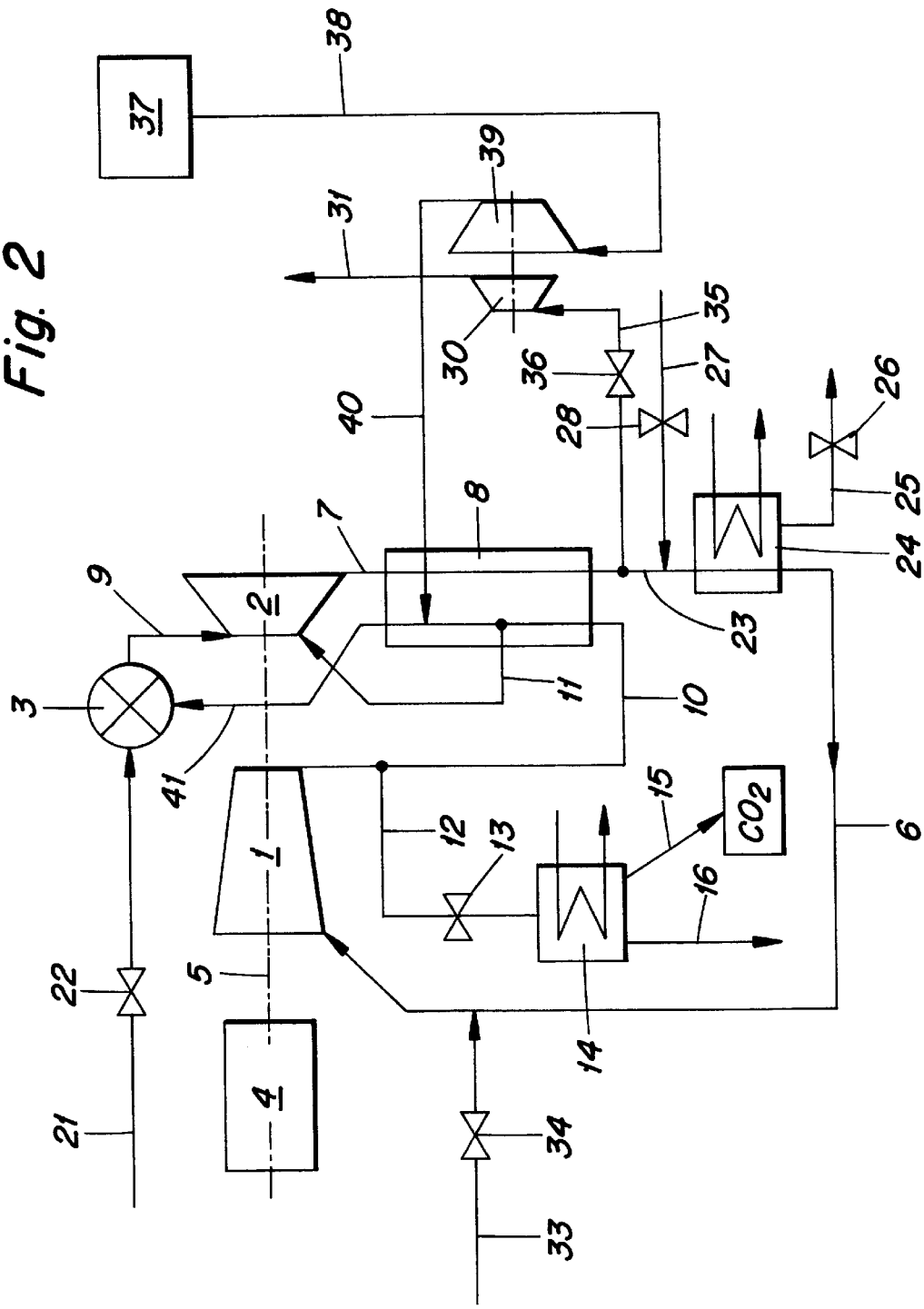
FIG. 2 shows a modified version of the circuit in accordance with FIG. 1, with various extensions in the area of fuel provision.

FIG. 2 differs from FIG. 1 in that the oxygen 38 required for operating the combustion comes from a separation plant 37 and, at least during a charged mode of operation, is compressed to a higher pressure in an oxygen compressor 39. The oxygen compressor 39 itself is driven by a turbine 30, to which in turn excess gas 35 is admitted via a control member 36. This excess gas 35 is branched off on the low-pressure side directly downstream of the recuperator 8. Depending on the degree of charging and the temperature, this extraction or branching off may be carried out at a suitable point on the low-pressure side inside the recuperator 8. The expanded excess gas 31 from the turbine 30 may then be used for further purposes. To this end, reference is made to the explanations with regard to FIG. 1.

The separation plant 37 may be a cryogenic air-separation plant, in which case the liquid fuel, by means of a pump which uses little power, is brought to the requisite pressure and is then heated. This heating may be effected with ambient heat, the waste heat of the recuperator 8 or in the recuperator 8 itself. In the present case, combustion oxygen 40 compressed in the compressor 39 is added to the compressed cycle medium 10, downstream of the cooling-fluid extraction 11, if this oxygen 40 is not fed directly into the combustion chamber 3. This solution is distinguished by the fact that it results in a higher efficiency. A further means of adding the oxygen, preferably without heating, consists in introducing this combustion oxygen 33 into the cycle on the low-pressure side. In FIG. 2, this relates to line 33 with control member 34. A further means of supplying oxygen can be brought about by the precompressed oxygen being fed into the line 6 at the intake-pressure level of the cycle medium. Such combustion oxygen can likewise easily be obtained via the line 33, and if need be via a further line (not shown in any more detail in the figure). The advantage here consists in the fact that no separate oxygen compressor has to be provided, whereby the combustion oxygen fed in participates automatically in the recuperative heat absorption.

Figure 3:
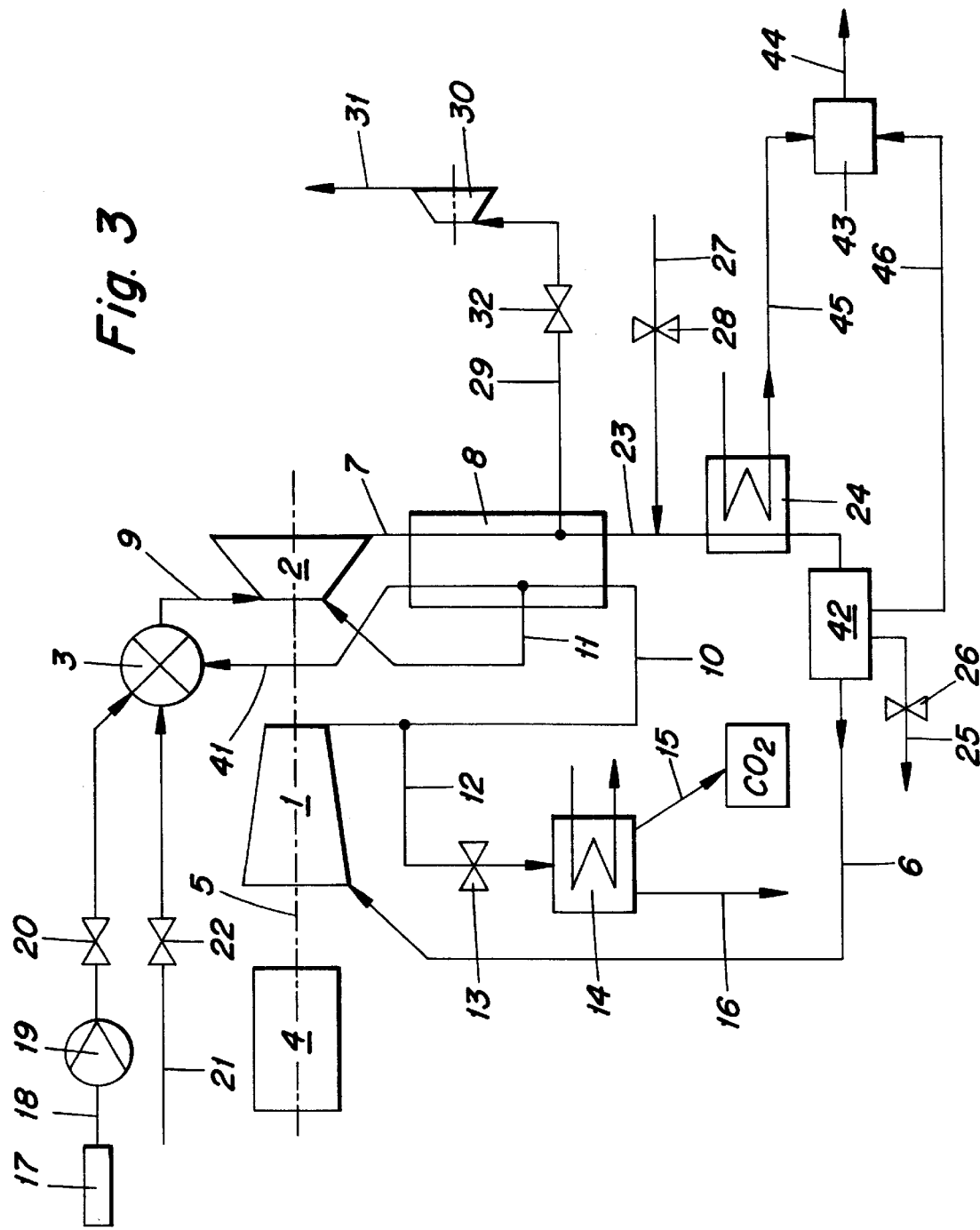
FIG. 3 shows a further modified version of the circuit in accordance with FIG. 1, the heat sink being operated by a further heat sink arranged downstream.
Figure 4:
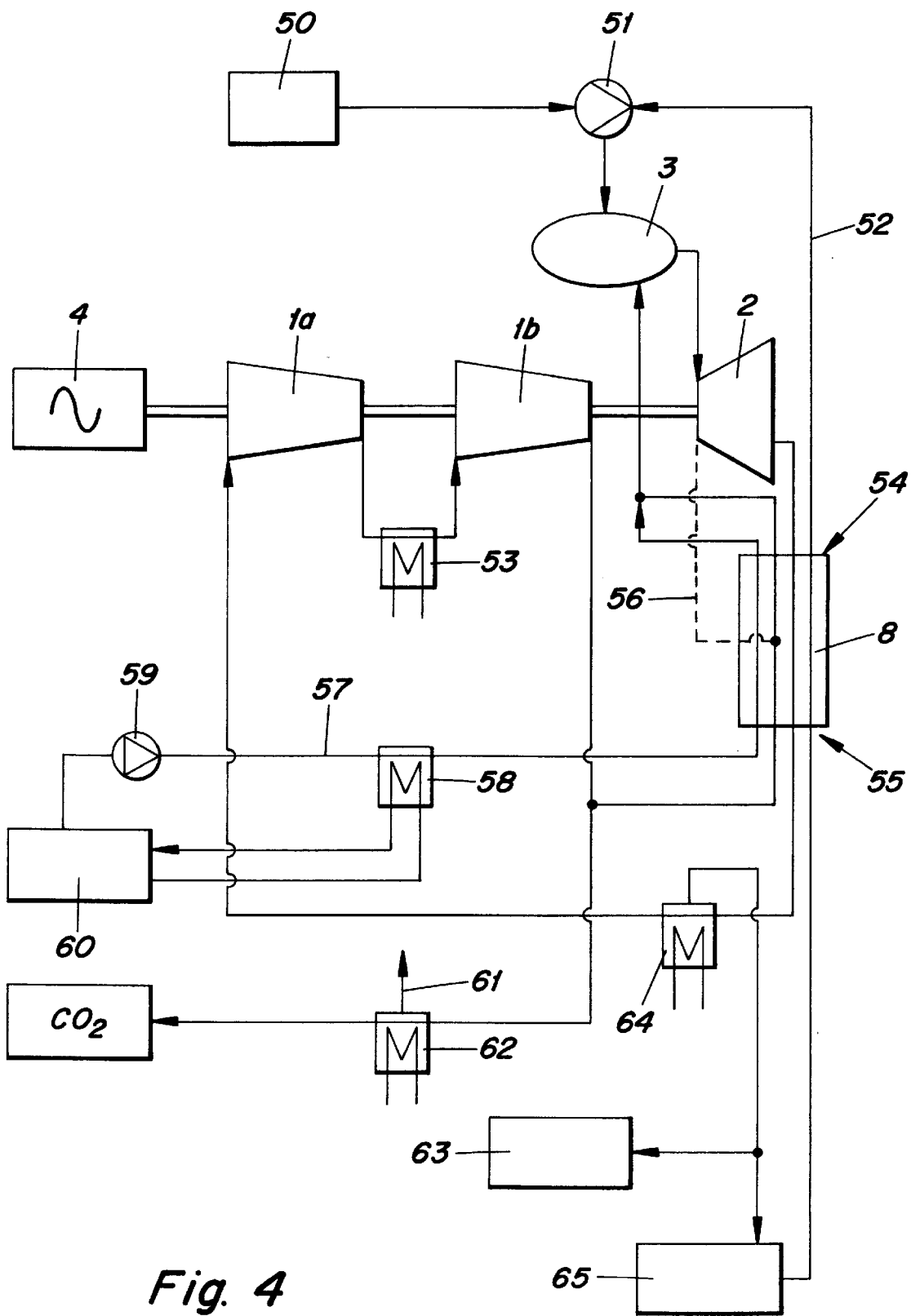
FIG. 4 shows a second embodiment of the circuit of this invention with a preheated oxygen compressor.
Figure 5:
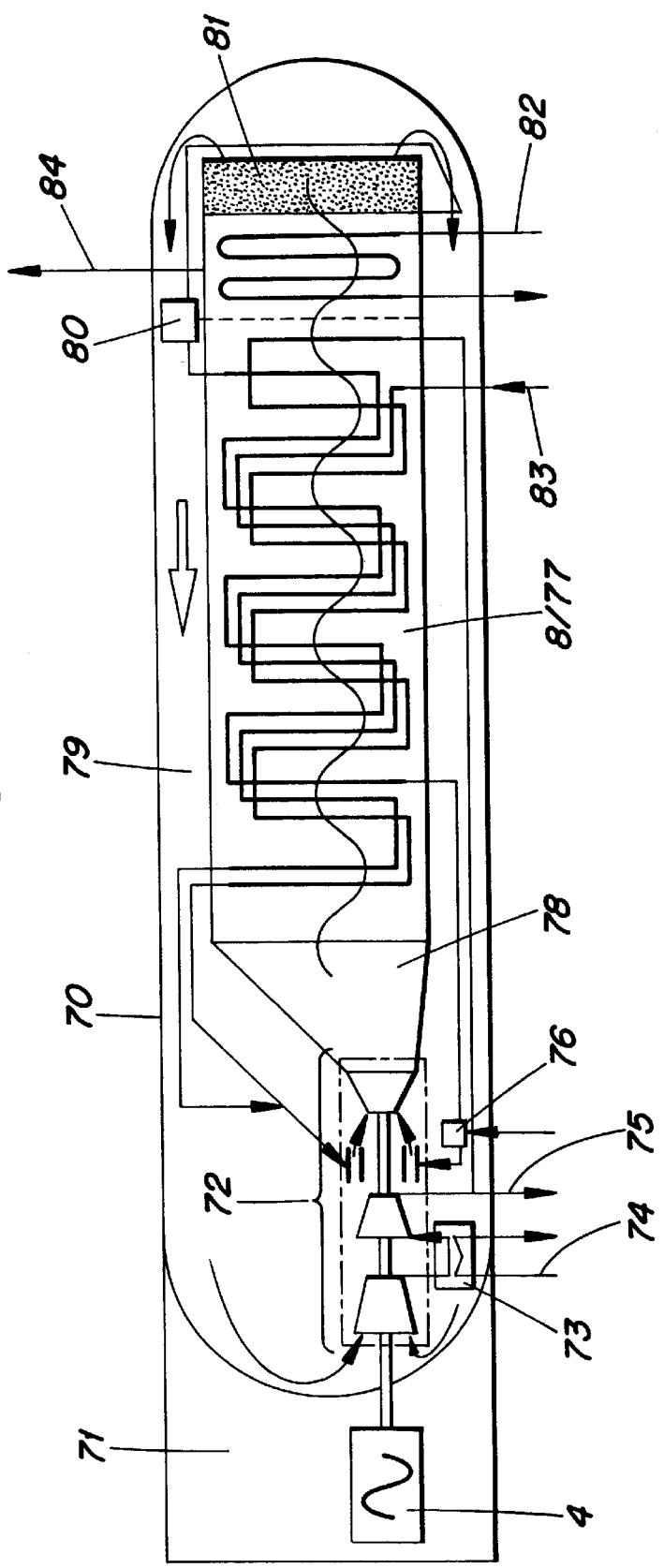
FIG. 5 is a cross-sectional view, partially schematic of a pressure vessel with integrated gasturbine group and recuperator.

FIG. 3 is based largely on FIG. 1. The difference here lies in the fact that a second heat sink 42 is arranged downstream of the first heat sink 24 working at ambient temperature, the second heat sink 42 performing the function of a so-called chiller. This second heat sink 42 is operated below the ambient temperature, the water separation 25 now taking place from this second heat sink 42. Operating in interaction with the first and second heat sinks is a refrigerating machine 43, the operation of which, on the one hand, is maintained by the thermal energy 45 from the first heat sink 24. On the other hand, this refrigerating machine is fed with heat energy 46 of lower temperature from the second heat sink 42. The operation of this refrigerating machine 43 then results in a heat emission 44 of average temperature for further purposes. Owing to the fact that the second heat sink 42 interacts with said refrigerating machine 43, the cycle medium 6 entering the compressor 1 is cooled down, so that the compressor power is reduced and the efficiency is directly increased, since the heat requirement remains unchanged on account of the recuperative step. In this case, the power requirement of the refrigerating machine is only a small fraction of the efficiency-related increase in output. The refrigerating machine 43 may involve an absorption process or a conventional process with a compressor. For example, at a compressor pressure ratio of 8, the compressor power, at a temperature reduction of around 3.2° C., is in each case reduced by 1%. A temperature reduction of around 20–40° C. results in a reduction of the compressor power of around 6–12%. The subsequent installation of the second heat sink 42 is possible at any time at little cost.

The variants according to FIGS. 1–3 are also especially suitable for low-calorific fuels and/or fuels containing ash, for example heavy oils, pulverized-coal/water mixtures, LBTU, MBTU gases, etc. In the case of low-calorific fuels, the temperature increases after the recuperator, so that utilization in a steam or kalina process has its advantages. Very high efficiencies are then achieved with such fuels.

In the case of fuels containing ash, a cleaning stage for the circulated fluid is required upstream or downstream of a heat sink 24. A cyclone separator upstream of the chiller and a design of the chiller as a spray cooler are conceivable here. A compact type of construction and at the same time good ash-particle separation are thus achieved. The separated water 25 may be reprocessed and reused in a known manner, in the course of which an excess of water, which is very desirable in arid regions, is obtained in the case of hydrogenous fuels.

The particular suitability of the circuits according to FIGS. 1–3 for fuels containing ash results from the fact that, on the one hand, a dust-tolerant design is facilitated in the case of a turbine having only two stages and, on the other hand, the higher density during charging has a greater dragging effect on the particles, which leads to fewer deposits.

The gas-turbine group according to one of FIGS. 1–3 can easily be replaced by a sequentially fired plant according to EP-0 620 362 A1, this publication being incorporated herein by reference.

The units of the power station plant, such as compressor 1, turbine 2, recuperator 8 and heat sink 24, are accommodated in a pressure vessel. In this case, the cooled cycle medium 6 flows back to the compressor 1 in a suitable manner inside the pressure vessel. This measure achieves a situation in which the recuperator 8, on the hot side, need only be designed for its own pressure drops and not for the charging pressure in the line 6, since the charging pressure is absorbed by the inherently cold pressure vessel. In addition, the pressure vessel also acts as an additional aftercooling area.

A further possibility of this basic idea consists in likewise accommodating the generator 4 in the pressure vessel. In this way, no movable shaft seal with respect to the charging pressure is necessary and the generator 4 can run in a $CO_2$ atmosphere, if need be refiltered. As a result of the increased heat transfers during charged operation, the generator 4 can be of smaller construction and can be cooled directly with the circulating $CO_2$. The conventional separate cooling system is dispensed with in this case. In this system, the cooling effect increases with the output, which is proportional to the charging pressure, whereas the ventilation resistance becomes smaller at low charging pressure and a high part-load efficiency is thereby obtained.

The entire module in the pressure vessel may be firmly anchored and arranged in a floating manner in or under water. As a result, the usually lower water temperature at many installation sites is additionally utilized for the cooling; furthermore, foundations are saved. The pressure vessel has access openings for servicing as well as ventilation devices for expelling the $CO_2$ before inspection.

If the generator 4 is not accommodated in the pressure vessel, suitable seals are provided for the emerging rotor shaft 5.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of operating a power station plant, the power station plant having a compressor unit, at least one combustion chamber and at least one turbine, and a recuperator downstream from the turbine, the method comprising:

supplying a cycle medium containing $CO_2$ and a fuel and the oxygen required for the oxidation thereof in the combustion chamber, conducting the cycle medium from the low-pressure side of the turbine to the recuperator, passing the medium through a heat sink downstream of the recuperator, the heat sink being operated at least at ambient temperature, feeding the medium back into the compressor unit, withdrawing a portion of the cycle medium downstream of the compressor and upstream of the recuperator and conducting the withdrawn portion into a condensing plant, and controlling the charging pressure of the cycle processs by extracting any excess cycle medium.

2. The method as claimed in claim 1, wherein the step of withdrawing a portion of the cycle medium, corresponds to a certain separation rate of $CO_2$ with which the degree of charging of the cycle process and its output are correspondingly controlled.

3. The method as claimed in claim 1, wherein gases produced in the cycle process are separated from the condensing plant at the same time.

4. The method as claimed in claim 1, wherein a $CO_2$ quantity is directed into the cycle in order to start the process.

5. The method as claimed in claim 4, wherein the $CO_2$ quantity is directed into the thermally treated exhaust gases on the low-pressure side.

6. The method as claimed in claim 1, wherein a quantity of the cycle medium is branched off on the low-pressure side from the recuperator, or downstream of the recuperator in order to operate an expander.

* * * * *